(12) United States Patent
Luo et al.

(10) Patent No.: US 12,405,499 B2
(45) Date of Patent: Sep. 2, 2025

(54) LCD DISPLAY HAVING INCREASED CONTRAST STRUCTURE, AND DISPLAY DEVICE

(71) Applicant: Huizhou TCL Cloud Internet Corporation Technology Co., Ltd., Guangdong (CN)

(72) Inventors: Guangyue Luo, Guangdong (CN); Jie Luo, Guangdong (CN); Yunguo Zhao, Guangdong (CN)

(73) Assignee: Huizhou TCL Cloud Internet Corporation Technology Co., Ltd., Guangdong (CN)

( * ) Notice: Subject to any disclaimer, the term of this patent is extended or adjusted under 35 U.S.C. 154(b) by 0 days.

(21) Appl. No.: 18/575,403

(22) PCT Filed: May 6, 2022

(86) PCT No.: PCT/CN2022/091271
§ 371 (c)(1),
(2) Date: Dec. 29, 2023

(87) PCT Pub. No.: WO2023/000761
PCT Pub. Date: Jan. 26, 2023

(65) Prior Publication Data
US 2024/0310673 A1   Sep. 19, 2024

(30) Foreign Application Priority Data
Jul. 23, 2021 (CN) .......................... 202110835169.9

(51) Int. Cl.
*G02F 1/13357* (2006.01)
*G02F 1/1335* (2006.01)
(Continued)

(52) U.S. Cl.
CPC .. *G02F 1/133606* (2013.01); *G02F 1/133514* (2013.01); *G02F 1/133528* (2013.01); *G02F 1/1347* (2013.01); *G02F 1/1368* (2013.01)

(58) Field of Classification Search
CPC ......... G02F 1/133606; G02F 1/133514; G02F 1/133528; G02F 1/1347; G02F 1/1368
See application file for complete search history.

(56) References Cited

U.S. PATENT DOCUMENTS

2005/0190329 A1* 9/2005 Okumura .............. G02F 1/1323
349/123
2021/0124194 A1* 4/2021 Liu .................... G02F 1/133528

FOREIGN PATENT DOCUMENTS

CN  1661421 A  8/2005
CN  102789089 A  11/2012
(Continued)

OTHER PUBLICATIONS

International Search Report in International application No. PCT/CN2022/091271, mailed on Aug. 8, 2022.
(Continued)

*Primary Examiner* — Mariam Qureshi
(74) *Attorney, Agent, or Firm* — PV IP PC; Wei Te Chung

(57) ABSTRACT

The present invention relates to the field of display, and in particular to an LCD display having an increased contrast structure, comprising: a backlight layer (1), a backlight control layer (2), and a light display layer (3). The backlight layer (1), the backlight control layer (2), and the light display layer (3) are successively connected; the backlight layer (1) is configured to emit a light source; the backlight control layer (2) filters the light source emitted by the backlight layer (1); the light display layer (3) is provided with a light display surface (305), and the light display surface (305)
(Continued)

displays visible light filtered by the backlight control layer (2).

10 Claims, 1 Drawing Sheet

(51) Int. Cl.
*G02F 1/1347* (2006.01)
*G02F 1/1368* (2006.01)

(56) References Cited

FOREIGN PATENT DOCUMENTS

| | | | |
|---|---|---|---|
| CN | 108445683 | A | 8/2018 |
| CN | 108761888 | A | 11/2018 |
| CN | 109901330 | A | 6/2019 |
| CN | 110673411 | A | 1/2020 |
| CN | 111025748 | A | 4/2020 |
| CN | 112748605 | A | 5/2021 |
| CN | 113655657 | A | 11/2021 |
| JP | H09159817 | A | 6/1997 |
| JP | 2001066626 | A | 3/2001 |
| JP | 2006337389 | A | 12/2006 |
| JP | 2007114394 | A | 5/2007 |
| WO | 2020224314 | A1 | 11/2020 |
| WO | 2021063333 | A1 | 4/2021 |

OTHER PUBLICATIONS

Written Opinion of the International Search Authority in International application No. PCT/CN2022/091271, mailed on Aug. 8, 2022.

1st Chinese Office Action issued in corresponding Chinese Patent Application No. 202110835169.9 dated Apr. 4, 2023, pp. 1-7.

2nd Chinese Office Action issued in corresponding Chinese Patent Application No. 202110835169.9 dated Aug. 18, 2023, pp. 1-6.

* cited by examiner

LCD DISPLAY HAVING INCREASED CONTRAST STRUCTURE, AND DISPLAY DEVICE

This application claims priority to Chinese Patent Application No. 202110835169.9, filed with the Chinese Patent Office on Jul. 23, 2021, entitled "LCD DISPLAY HAVING INCREASED CONTRAST STRUCTURE, AND DISPLAY DEVICE", the disclosure of which is incorporated herein by reference in its entirety.

TECHNICAL FIELD

The present disclosure relates to the field of displays, and more particularly, to an LCD display having a structure for increasing contrast and a display device.

BACKGROUND

With the evolution of technology, the display industry has begun to gradually transition from an Liquid Crystal Display (LCD) to an Organic Light Emitting Diode (OLED), where the LCD has a significant disadvantage in the dynamic range compared to the glorious high dynamics of the OLED, i.e., insufficient contrast of the LCD. Compared to the OLED that has contrast of tens to millions, conventional LCD has only a contrast of 1000-3000. The dynamic range the contrast of the LCD is greatly limited to make the LCD significantly inferior to the OLED display when performing the HDR playback.

In a conventional LCD display technology in a conventional solution in which a white backlight is combined with a TFT cell, polarizers are respectively attached to both sides of the cell. However, since the transmittance and the polarization degree of the polarizers are mutually exclusive where the polarization degree is generally between 90-99%, that is, a small portion of light rays are always leaked, so that a dark portion of the LCD is not dark enough so that the contrast of the LCD can only be maintained at a level of 800-2000.

FIG. 1 shows a conventional solution in which 100 represents a Color Filter (CF) and 200 represents an array (a TFT array, an active switching matrix; TFT-thin film Field Effect Transistor), 300 represents a backlight, 400 represents a Black Matrix (BM), 500 represents a lower polarizer, 600 represents an upper polarizer. In the conventional solution, the change of color and brightness is realized by switching of red, green and blue sub-pixels.

SUMMARY

Technical Problems

Since the polarization degree of the polarizer cannot reach 100% in theory, and complex transmission, reflection, and refraction of film layers in the LCD cell make pixels not completely closed, that is, light rays of the backlight always leaks through the LCD to reach the human eyes, the LCD cannot have contrast of tens or millions like the OLED.

Solutions to Problems

Technical Solutions

An embodiment of the present disclosure provides an LCD display having a structure for increasing contrast, in which a backlight control layer is disposed to perform a pixel-level control on transmission of light rays, so that a backlight of a black or dark picture of a light display layer is blocked to a minimum brightness, so that light rays reaching the light display layer cannot pass through the light display layer, thereby realizing ultra-high contrast of the light display layer.

According to an embodiment of the present disclosure, there is provided an LCD display having a structure for increasing contrast, including: a backlight layer configured to emit light; a backlight control layer configured to filter the light emitted by the backlight layer; and a light display layer provided with a light display surface for displaying visible light filtered by the backlight control layer; where the backlight layer, the backlight control layer, and the light display layer are connected sequentially.

Further, the backlight control layer includes: a first polarizer connected to the backlight layer and configured to convert the light emitted by the backlight layer into polarized light; and a first glass substrate stacked with the first polarizer and connected to the light display layer.

The first glass substrate includes a first lower glass substrate and a first upper glass substrate, a liquid crystal layer is disposed between the first lower glass substrate and the first upper glass substrate, and the liquid crystal layer twists a polarization angle of the polarized light. The first upper glass substrate and the first lower glass substrate are stacked with each other. The first lower glass substrate is connected to the first polarizer, and the first upper glass substrate is connected to the light display layer.

Further, a pixel point structure for controlling one or more light pixels is provided in the first upper glass substrate.

Further, the light display layer includes: a second polarizer connected to the first upper glass substrate and configured to filter light passing through the first upper glass substrate; and a second glass substrate stacked with the second polarizer.

Further, the second glass substrate includes: a second upper glass substrate; and a second lower glass substrate stacked with the second upper glass substrate and connected to the second polarizer.

Further, the second upper glass substrate is a color filter, and the second lower glass substrate is an array of thin film field effect transistors.

Further, the light display layer further includes: a third polarizer for displaying the visible light and connected to the second upper glass substrate.

Further, the light display layer further includes: a grid layer for preventing pixels from mixing colors and disposed within the second upper glass substrate.

Further, the backlight control layer is a backlight control liquid crystal cell, and the light display layer is a display liquid crystal cell.

Another embodiment of the present disclosure further provides a display device, including: an LCD display having a structure for increasing contrast, where the LCD display includes: a backlight layer configured to emit light; a backlight control layer configured to filter the light emitted by the backlight layer; and a light display layer provided with a light display surface for displaying visible light filtered by the backlight control layer; where the backlight layer, the backlight control layer, and the light display layer are connected sequentially.

Further, in the display device, the backlight control layer includes: a first polarizer connected to the backlight layer and configured to convert the light emitted by the backlight layer into polarized light; and a first glass substrate stacked with the first polarizer and connected to the light display layer.

The first glass substrate includes a first lower glass substrate and a first upper glass substrate stacked with the first lower glass substrate, a liquid crystal layer is disposed between the first lower glass substrate and the first upper glass substrate, and the liquid crystal layer twists a polarization angle of the polarized light. The first lower glass substrate is connected to the first polarizer, and the first upper glass substrate is connected to the light display layer.

Further, in the display device, a pixel point structure for controlling one or more light pixels is provided in the first upper glass substrate.

Further, in the display device, the light display layer includes: a second polarizer connected to the first upper glass substrate and configured to filter light passing through the first upper glass substrate; and a second glass substrate stacked with the second polarizer.

Further, in the display device, the second glass substrate includes: a second upper glass substrate; and a second lower glass substrate stacked with the second upper glass substrate and connected to the second polarizer.

Further, in the display device, the second upper glass substrate is a color filter, and the second lower glass substrate is an array of thin film field effect transistors.

Further, in the display device, the light display layer further includes: a third polarizer for displaying the visible light and connected to the second upper glass substrate.

Further, in the display device, the light display layer further includes: a grid layer for preventing pixels from mixing colors and disposed within the second upper glass substrate.

Further, in the display device, the backlight control layer is a backlight control liquid crystal cell.

Further, in the display device, the light display layer is a display liquid crystal cell.

Beneficial Effects of the Present Disclosure

Beneficial Effects

The LCD display having a structure for increasing contrast according to any one of the embodiments of the present disclosure includes: a backlight layer configured to emit light; a backlight control layer configured to filter the light emitted by the backlight layer; and a light display layer provided with a light display surface for displaying visible light filtered by the backlight control layer; where the backlight layer, the backlight control layer, and the light display layer are connected sequentially. By disposing the backlight control layer between the backlight layer and the light display layer, the backlight control layer can be configured to perform a pixel-level filtering control on transmission of light rays, so as to block light of a black area of the light display layer to a minimum brightness, so that the light rays reaching the light display layer cannot pass through the display surface, thereby realizing ultra-high contrast of the display surface of the light display layer.

BRIEF DESCRIPTION OF THE DRAWINGS

Description of the Drawings

Figure 1:
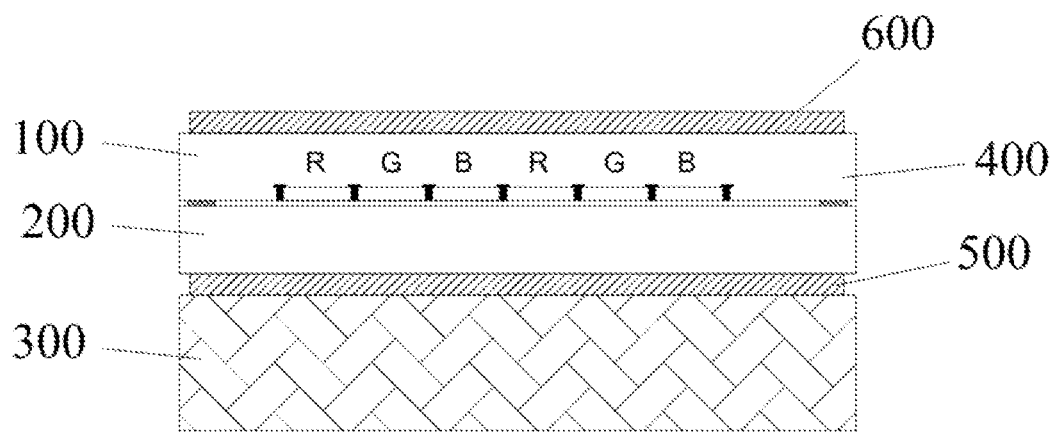
Figure 2:
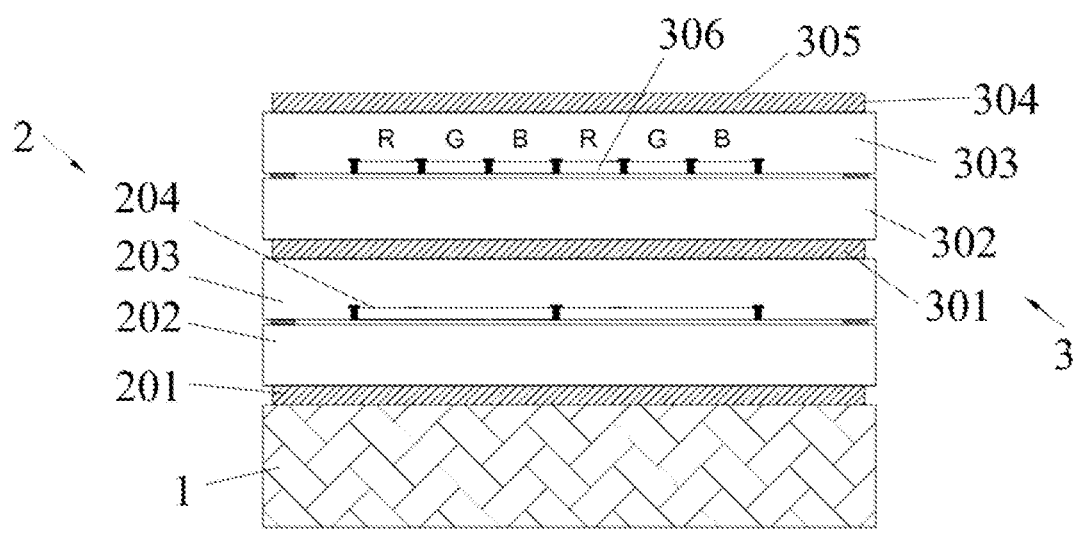

The accompanying drawings are illustrated herein to provide a further understanding of the present disclosure and constitute a part of the present disclosure, and exemplary embodiments of the present disclosure and the description thereof are configured to explain the present disclosure, and are not to be construed as unduly limiting the present disclosure. In the drawings:

FIG. 1 is a block diagram of a structure of the prior art of the present disclosure;

FIG. 2 is a structural diagram of an LCD display having a structure for increasing contrast according to the present disclosure.

REFERENCE SIGNS

1—backlight layer, 2—backlight control layer, 201—first polarizer, 202—first lower glass substrate, 203—first upper glass substrate, 204—pixel point structure, 3—light display layer, 301—second polarizer, 302—second lower glass substrate, 303—second upper glass substrate, 304—third polarizer, 305—display surface, 306—grid layer, 100—color filter, 200—TFT array, 300—backlight, 400—black matrix, 500—lower polarizer, and 600—upper polarizer.

EMBODIMENTS OF THE PRESENT DISCLOSURE

Detailed Description

In order that the embodiments of the present disclosure may be better understood by those skilled in the art, technical solutions in the embodiments of the present disclosure would be clearly and completely described below in conjunction with drawings in the embodiments of the present disclosure. Obviously, the described embodiments are only a portion of embodiments of the present disclosure, rather than all the embodiments. Any ordinarily skilled person in the technical field of the present invention could still obtain other accompanying drawings without use laborious invention based on the present accompanying drawings. The embodiments described by reference to the accompanying drawings are exemplary and are merely illustrative of the present disclosure and are not to be construed as limiting the present disclosure. Further, if the detailed description of the known art is unnecessary for showing the features of the present disclosure, it is omitted.

It should be noted that the terms "first", "second", etc. in the present disclosure and claims as well as the drawings are used to distinguish similar objects, and do not have to be used to describe a specific order or sequence. It should be understood that the data so used may be interchanged as appropriate so that the embodiments of the present disclosure described herein can be implemented in an order other than those illustrated or described herein. Furthermore, the terms "comprising" and "having", as well as any variations thereof, are intended to cover a non-exclusive inclusion. For example, a process, a method, a system, a product, or a device that includes a series of steps or units is not necessarily limited to those steps or units expressly listed, but alternatively may further includes the unlisted steps or units, or another step or unit inherent to the process, the method, the product, or the device.

Those skilled in the art can understand that, unless otherwise defined, all terms (including technical and scientific terms) used herein have the same meanings as those commonly understood by those of ordinary skill in the art to which the disclosure belongs. It should also be understood that terms, such as those defined in commonly used dictionaries, should be interpreted as having a meaning that is consistent with the meaning of the context of the current technology and will not be interpreted in an idealized or overly formal sense unless defined as here.

As shown in FIG. 2, the present disclosure provides an LCD display having a structure for increasing contrast, including: a backlight layer 1 configured to emit light; a backlight control layer 2 configured to filter the light emitted by the backlight layer 1; and a light display layer 3 provided with a light display surface 305 for displaying visible light filtered by the backlight control layer 2; where the backlight layer 1, the backlight control layer 2, and the light display layer 3 are connected sequentially.

The LCD display having a structure for increasing contrast according to any one of the embodiments of the present disclosure includes: the backlight layer 1 configured to emit light; the backlight control layer 2 configured to filter the light emitted by the backlight layer 1; and the light display layer 3 provided with the light display surface 305 for displaying visible light filtered by the backlight control layer 2; where the backlight layer 1, the backlight control layer 2, and the light display layer 3 are connected sequentially. By disposing the backlight control layer 2 between the backlight layer 1 and the light display layer 3, the backlight control layer 2 can be configured to perform a pixel-level filtering control on transmission of light rays, so as to block light of a black area or a dark area of the light display layer 3 to a minimum brightness, so that the light rays reaching the light display layer 3 cannot pass through the display surface 305, thereby realizing ultra-high contrast of the display surface 305 of the light display layer 3.

Specifically, the solution proposed in the present disclosure is a technical solution with mass production feasibility. By disposing the backlight control layer 2 between the backlight layer 1 and the light display layer 3, the backlight control layer 2 can greatly increase contrast of the LCD display by filtering light, thereby improving a viewing experience of the LCD display.

The LCD of the prior art solution generally achieves only contrast of 800-2000 while it is possible for the LCD display of the present disclosure to increase the contrast by several tens and hundreds times to a level close to the contrast of the OLED.

A conventional LCD consists of a cell (an active TFT array with a liquid crystal cell) and a backlight, and the conventional backlight belongs to a surface light source and cannot be controlled locally. The present disclosure can achieve the purpose of ultra-high contrast by adding a lower liquid crystal cell to implement local control of the backlight.

The present disclosure innovatively proposes a novel architecture that employs a dual LCD overlay scheme. A lower layer LCD is configured as the backlight control layer 2 to perform a pixel-level control on transmission of light rays, so as to block the backlight at the back of a partial dark area of the light display layer 3 to a minimum brightness. Then, an upper layer LCD is configured as the light display layer 3 to operate the pixels, so that the light rays reaching the light display layer 3 cannot substantially pass through the display surface 305 of the light display layer 3, thereby achieving ultra-high contrast.

Specifically, in this architecture configuration of the upper and lower layer LCDs, the backlight can selectively pass through the lower layer LCD layer serving as the backlight control layer 2, and the display surface 305 of the light display layer 3 is generally composed of light and dark areas. In order to improve the contrast of the display surface 305, light needs to be limited in the dark area while light does not need to be limited in the light area. The brightness of the dark area is limited and the brightness of the light area is displayed lighter, thereby greatly increasing the contrast of the display surface 305.

In some embodiments, the backlight control layer 2 includes: a first polarizer 201 connected to the backlight layer 1 and configured to convert the light emitted by the backlight layer 1 into polarized light; and a first glass substrate stacked with the first polarizer 201 and connected to the light display layer 3, where a liquid crystal layer twists a polarization angle of the polarized light. By disposing the first polarizer 201 connected to the backlight layer 1, the first polarizer 201 is configured to convert light rays passing through the polarizer into polarized light. The light rays are emitted from the backlight layer 1 and then converted into polarized light after passing through the first polarizer 201, and the polarization angle of the light rays can be controlled by energizing the liquid crystal of the first glass substrate. A liquid crystal layer (not shown) is disposed between the first lower glass substrate 202 and the first upper glass substrate 203 and twists the polarization angle of the polarized light.

In some embodiments, the first glass substrate includes: a first lower glass substrate 202 connected to the first polarizer 201; and a first upper glass substrate 203 stacked with the first lower glass substrate 202 and connected to the light display layer 3. The first glass substrate includes two layers stacked vertically with each other, that is, the first lower glass substrate 202 and the first upper glass substrate 203, where, the first lower glass substrate 202 is connected to the first polarizer 201, and the first upper glass substrate 203 is connected to a second polarizer 301 of the light display layer 3. The first polarizer 201 converts light rays passing through the first polarizer 202 into polarized light, and the polarization angle of the light rays can be controlled by energizing the liquid crystal of the first lower glass substrate 202.

In some embodiments, a pixel point structure 204 for controlling one or more light pixels is provided in the first upper glass substrate 203. The pixel point structure 204 is one or more control pixels that constitute the smallest unit of the backlight control layer 2.

In some embodiments, the light display layer 3 includes: a second polarizer 301 connected to the first upper glass substrate 203 and configured to filter light rays passing through the first upper glass substrate 203; and a second glass substrate stacked with the second polarizer.

The light rays passing through the first glass substrate is twisted by the first lower glass substrate 202, and a portion of the twisted light rays is filtered out by the second polarizer 301 (i.e., the portion is twisted to a direction perpendicular to the polarization direction of the second polarizer 301) while remaining portion of the twisted light rays that is not filtered out by the second polarizer 301 then enters the upper layer LCD, i.e. the light display layer 3.

In some embodiments, the second glass substrate includes: a second upper glass substrate 303; and a second lower glass substrate 302 stacked with the second upper glass substrate 303 and connected to the second polarizer 201. The second glass substrate includes two layers stacked vertically with each other, that is, the second upper glass substrate 303 and the second lower glass substrate 302, where, the second lower glass substrate 302 is connected to the second polarizer 301, and the second upper glass substrate 303 is connected to a third polarizer 304.

In some embodiments, the second upper glass substrate 303 is a color filter, and the second lower glass substrate 302 is an array of thin film field effect transistors. The second upper glass substrate 303 may be configured as a color filter, and the second lower glass substrate 302 may be configured as thin film field effect transistors arranged in an array.

In some embodiments, the light display layer 3 further includes: a third polarizer 304 for displaying visible light and connected to the second upper glass substrate 303. A portion of the light rays is filtered out by the second polarizer 301, and remaining portion of the light rays passing through the second polarizer 301 is modulated by correction angle of RGB sub-pixels of the second glass substrate and then passes through the third polarizer 304 to form light rays visible to the human eyes on the display surface 305 of the third polarizer 304.

In some embodiments, the light display layer 3 further includes: a grid layer 306 for preventing pixels from mixing colors and disposed within the second upper glass substrate 303. Before the light rays passing through the third polarizer 304 are displayed, the light rays further pass through the grid layer 306 disposed within the second upper glass substrate 303. The grid layer 306 may isolate red sub-pixels R, green sub-pixels G, and blue sub-pixels B to prevent the pixels from mixing colors. The grid layer 306 is similar to a black grid.

In some embodiments, the backlight control layer 2 is configured as a backlight control liquid crystal cell, and the light display layers is configured as a display light liquid crystal cell.

An overall operation process of the present disclosure is generally as follows.

Light rays are emitted from the backlight layer 1, and pass through the first polarizer 201 and are converted into polarized light; the polarization angle of the light rays can be controlled by energizing the liquid crystal of the first lower glass substrate 202 and depending on the energizing case; the light rays passing through the first lower glass substrate 202 are twisted, and a portion of the twisted light rays is filtered out by the second polarizer 301 (i.e., the portion is twisted to a direction perpendicular to the polarization direction of the second polarizer 301); the remaining portion of the light rays passing through the second polarizer 301 then enters the upper layer LCD, that is, the light display layer 3; and the remaining portion of the light rays passing through the second polarizer 301 is modulated by correction angle of RGB sub-pixels of the second glass substrate 303 and then passes through the third polarizer 304 to form light rays visible to the human eyes on the display surface 305 of the third polarizer 304.

An area defined by the above-mentioned twisted light rays and the polarization direction of the second polarizer 301 is a dark area of a picture, and an filtering operation of controlling the light of the liquid crystal cell is correspondingly performed within the dark area, so as to reduce the backlight supply of the dark area. Thus, the brightness of the dark area is reduced, so that the contrast is significantly improved.

The LCD display having a structure for increasing contrast according to any one of the embodiments of the present disclosure includes: the backlight layer 1 configured to emit light; the backlight control layer 2 configured to filter the light emitted by the backlight layer 1; and the light display layer 3 provided with the light display surface 305 for displaying visible light filtered by the backlight control layer 2; where the backlight layer 1, the backlight control layer 2, and the light display layer 3 are connected sequentially. By disposing the backlight control layer 2 between the backlight layer 1 and the light display layer 3, the backlight control layer 2 can be configured to perform a pixel-level filtering control on transmission of light rays, so as to block light of the dark area of the light display layer 3 to a minimum brightness, so that the light rays reaching the light display layer 3 cannot pass through the display surface 305, thereby realizing ultra-high contrast of the display surface 305 of the light display layer 3.

The present disclosure further provides a display device, including an LCD display having a structure for increasing contrast. The display device may be any product or apparatus having a display function, such as a mobile phone, a tablet computer, a television, a notebook computer, a digital photo frame, or a navigator.

The foregoing description is merely preferred embodiments of the present disclosure, and it is not to be construed that the specific embodiments of the present disclosure are limited to the description. It should be noted that several modifications and embellishments may be made by those skilled in the art without departing from the principles of the present disclosure, and such modifications and embellishments are also to be considered as the scope of the present disclosure.

What is claimed is:

1. A liquid crystal display (LCD) display having a structure for increasing contrast, comprising:
   a backlight layer configured to emit light;
   a backlight control layer configured to filter the light emitted by the backlight layer; and
   a light display layer provided with a light display surface for displaying visible light filtered by the backlight control layer;
   wherein the backlight layer, the backlight control layer, and the light display layer are connected sequentially;
   wherein the backlight control layer comprises a first glass substrate, the first glass substrate comprises a first lower glass substrate and a first upper glass substrate stacked with the first lower glass substrate;
   wherein the light display layer comprises a second polarizer connected to the first upper glass substrate and configured to filter the light passing through the first upper glass substrate;
   wherein the light display layer comprises a second glass substrate stacked with the second polarizer, the second glass substrate comprises a second upper glass substrate; and a second lower glass substrate stacked with the second upper glass substrate and connected to the second polarizer;
   wherein by disposing the backlight control layer between the backlight layer and the light display layer, the backlight control layer is configured to perform a pixel-level filtering control on a transmission of the light, so as to block the light of a black area of the light display layer, such that the light reaching the light display layer is prevented from passing through the light display surface, the light passing through the first lower glass substrate is twisted, and an area defined by a twisted light and a polarization direction of the second polarizer is a dark area of a picture;
   wherein a pixel point structure for controlling one or more light pixels is provided in the first upper glass substrate, the pixel point structure is one or more control pixels that constitute a smallest unit of the backlight control layer, the light display layer further comprises a grid layer for preventing pixels from mixing colors and disposed within the second upper glass substrate, and the grid layer is a black grid;
   wherein the backlight control layer is configured as a dual LCD overlay structure, with the lower LCD layer serving as the backlight control layer to perform pixel-level control on transmission of light rays, blocking the backlight in dark areas of the light display layer to a minimum brightness, while the upper LCD layer is configured as the light display layer to operate pixels, allowing light in bright areas to pass;

wherein the first glass substrate comprises a first lower glass substrate and a first upper glass substrate, with a liquid crystal layer disposed between them, and the polarization angle of the light can be twisted by the liquid crystal layer;

wherein the light display layer further comprises a third polarizer for displaying visible light, and the second upper glass substrate is a color filter, while the second lower glass substrate is an array of thin-film field effect transistors.

2. The LCD display of claim 1, wherein the backlight control layer comprises: a first polarizer connected to the backlight layer and configured to convert the light emitted by the backlight layer into polarized light; and a first glass substrate stacked with the first polarizer and connected to the light display layer; and a liquid crystal layer is disposed between the first lower glass substrate and the first upper glass substrate, and the liquid crystal layer twists a polarization angle of the polarized light; and the first lower glass substrate is connected to the first polarizer, and the first upper glass substrate is connected to the light display layer.

3. The LCD display of claim 2, wherein a pixel point structure for controlling one or more light pixels is provided within the first upper glass substrate.

4. The LCD display of claim 1, wherein the backlight control layer is a backlight control liquid crystal cell.

5. The LCD display of claim 1, wherein the light display layer is a display liquid crystal cell.

6. A display device, comprising: a liquid crystal display (LCD) display having a structure for increasing contrast, wherein the LCD display comprises:

a backlight layer configured to emit light;

a backlight control layer configured to filter the light emitted by the backlight layer; and a light display layer provided with a light display surface for displaying visible light filtered by the backlight control layer;

wherein the backlight layer, the backlight control layer, and the light display layer are connected sequentially;

wherein the backlight control layer comprises a first glass substrate, the first glass substrate comprises a first lower glass substrate and a first upper glass substrate stacked with the first lower glass substrate;

wherein the light display layer comprises a second polarizer connected to the first upper glass substrate and configured to filter the light passing through the first upper glass substrate;

wherein the light display layer comprises a second glass substrate stacked with the second polarizer, the second glass substrate comprises a second upper glass substrate; and a second lower glass substrate stacked with the second upper glass substrate and connected to the second polarizer;

wherein by disposing the backlight control layer between the backlight layer and the light display layer, the backlight control layer is configured to perform a pixel-level filtering control on a transmission of the light, so as to block the light of a black area of the light display layer, such that the light reaching the light display layer is prevented from passing through the light display surface, the light passing through the first lower glass substrate is twisted, and an area defined by a twisted light and a polarization direction of the second polarizer is a dark area of a picture;

wherein a pixel point structure for controlling one or more light pixels is provided in the first upper glass substrate, the pixel point structure is one or more control pixels that constitute a smallest unit of the backlight control layer, the light display layer further comprises a grid layer for preventing pixels from mixing colors and disposed within the second upper glass substrate, and the grid layer is a black grid;

wherein the backlight control layer is configured as a dual LCD overlay structure, with the lower LCD layer serving as the backlight control layer to perform pixel-level control on transmission of light rays, blocking the backlight in dark areas of the light display layer to a minimum brightness, while the upper LCD layer is configured as the light display layer to operate pixels, allowing light in bright areas to pass;

wherein the first glass substrate comprises a first lower glass substrate and a first upper glass substrate, with a liquid crystal layer disposed between them, and the polarization angle of the light can be twisted by the liquid crystal layer;

wherein the light display layer further comprises a third polarizer for displaying visible light, and the second upper glass substrate is a color filter, while the second lower glass substrate is an array of thin-film field effect transistors.

7. The display device of claim 6, wherein the backlight control layer comprises: a first polarizer connected to the backlight layer and configured to convert the light emitted by the backlight layer into polarized light; and a first glass substrate stacked with the first polarizer and connected to the light display layer;

a liquid crystal layer is disposed between the first lower glass substrate and the first upper glass substrate, and the liquid crystal layer twists a polarization angle of the polarized light; and the first lower glass substrate is connected to the first polarizer, and the first upper glass substrate is connected to the light display layer.

8. The display device of claim 7, wherein a pixel point structure for controlling one or more light pixels is provided within the first upper glass substrate.

9. The display device of claim 6, wherein the backlight control layer is a backlight control liquid crystal cell.

10. The display device of claim 6, wherein the light display layer is a display liquid crystal cell.

* * * * *